No. 700,369. Patented May 20, 1902.
A. A. PIXLEY.
UNIVERSAL JOINT.
(Application filed July 29, 1901.)
(No Model.)

Witnesses
Frank A. Critter,
Stephen D. Taft Jr.

Inventor
Albert A. Pixley
By Webster Taft & Pixley
Attorneys

UNITED STATES PATENT OFFICE.

ALBERT A. PIXLEY, OF MITTINEAGUE, MASSACHUSETTS.

UNIVERSAL JOINT.

SPECIFICATION forming part of Letters Patent No. 700,369, dated May 20, 1902.

Application filed July 29, 1901. Serial No. 70,011. (No model.)

*To all whom it may concern:*

Be it known that I, ALBERT A. PIXLEY, a citizen of the United States, residing at Mittineague, in the county of Hampden and State of Massachusetts, have invented a new and useful Universal Joint, of which the following is a specification.

My invention relates to improvements in universal joints' or universal-joint couplings in which a split socket is fitted to the end of one shaft to receive the spherical head or ball on the end of another shaft, the parts being constructed, assembled, and operated in the manner hereinafter fully described and especially pointed out in the claims.

The objects of my improvements are to provide a durable, simple, inexpensive, and easily-assembled joint which permits one shaft to be revolved by another shaft while standing at an obtuse angle thereto. I am aware that it is not new, broadly speaking, to drive two shafts one from the other which deviate from a right line; but the particular joint used for this purpose and forming the subject of this invention is novel and possesses points of superiority over others in this class. I attain these objects by the mechanism illustrated in the accompanying drawings, in which—

Figure 1:
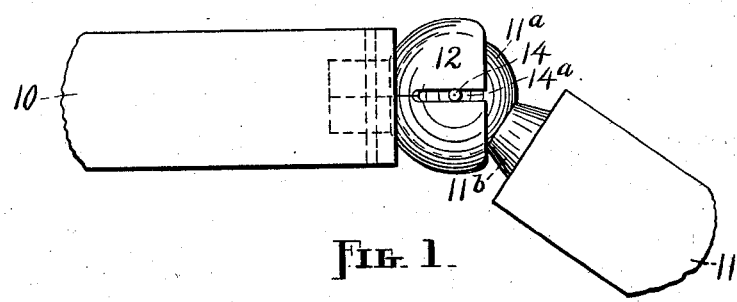
Figure 2:
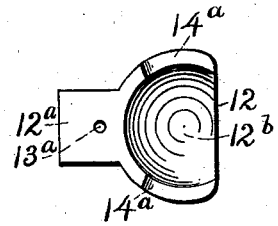
Figure 3:
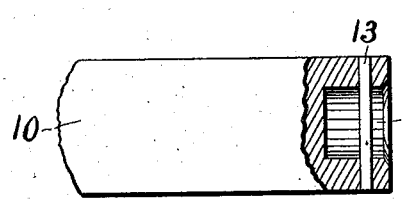
Figure 4:
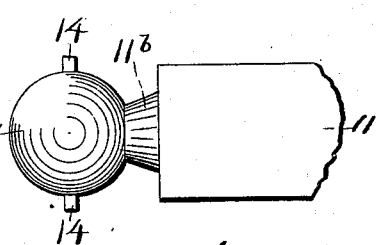
Figure 5:
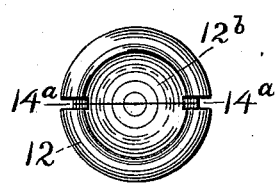

Figure 1 is a side view of my invention, showing one shaft flexed relative to the other; Fig. 2, an inside view of one-half of the split socket; Fig. 3, a side view, in partial section, of the chambered shaft; Fig. 4, a side view of the ball-provided shaft, showing the two driving-pins projecting from the ball; and Fig. 5, an outer end view of the socket.

Similar figures refer to similar parts throughout the several views.

Adjacent end sections of two shafts 10 and 11 or their equivalents are shown in the drawings, the first being the driving-shaft and the second the driven shaft, although this order may be reversed. In one end of the shaft 10 appears the chamber $10^a$ to receive the shank $12^a$ of the split socket 12. The pin 13 passes through the walls of the chamber $10^a$ and the hole $13^a$ in the shank $12^a$ to hold the shank 12 securely and rigidly in contiguity with the shaft 10. More than one pin may be employed for this purpose or some other suitable retaining means.

One end of the shaft 11 is equipped with the ball $11^a$, from opposite sides of which project the driving-pins 14 14. The ball $11^a$ may be substantially spherical, as shown, or more or less flattened, if desired. A neck $11^b$ is preferably interposed between the ball $11^a$ and the end of the shaft 11, although this feature is not an imperative requisite, as the increased amount of movement afforded by the pressure of said neck may be secured in its absence by hollowing out the end of the shaft 11 around the ball thereon.

The socket 12, which is split through its longitudinal center, and therefore comprises two separate and distinct pieces, has the internal chamber $12^b$ to receive the ball $11^a$ and the slots $14^a$ $14^a$ in opposite sides for the pins 14. When the two halves comprising the socket 12 are in position, the chamber $12^b$ is somewhat larger than one-half of the ball $11^a$. Hence said ball cannot escape when inclosed or engaged by the socket. The before-mentioned shank $12^a$ projects from the base of the socket 12. Each slot $14^a$ extends from the socket-rim to within a short distance of the base. The slots $14^a$ are formed in adjacent edges of the socket-pieces, but may be located intermediate of said edges, or mere grooves for the pins 14 may be cut in the walls of the chamber $12^b$ from the inside in place of said slots which extend clear through said walls.

Assuming that the several members are disconnected, the assembling and operating thereof are as follows: Place the separable parts of the socket 12 about the ball $11^a$, with the pins 14 in the slots $14^a$, insert the shank $12^a$ in the shaft-chamber $10^a$, and fasten with the pin 13. Now the shaft 11 may be journaled at any angle relative to the shaft 10—that is, within the range of independent movement of the ball $11^a$—and is capable of being rotated by said shaft 10. The independent movement of the ball $11^a$ is limited by that part of the neck $11^b$ which comes in contact with the edge of the socket 12, as shown in Fig. 1. The shaft 11 is revolved from the shaft 10 or, vice versa, by the driving-pins 14 and the sides of the slots $14^a$. While the slots $14^a$ freely permit an independent rolling movement of the ball, their sides or edges so confine and engage the pins 14 as to produce the rotation of the shaft 11 when the shaft 10 is revolved, as above stated. One pin and slot might be employed instead of two; but it is not believed that the best results can be obtained in this manner.

The construction of this joint provides for the quick and ready assembling of the parts, as before noted, and for the replacing of a broken member, also insures an easy running articulation comparatively free from friction.

What I claim as my invention, and desire to secure by Letters Patent, is—

1. In combination with a shaft having a chamber in one end, a split socket 12 provided with a shank and having slots in its sides, a second shaft having a ball at one end adapted to fit said socket, external pins on said ball to register with said slots, and means to secure said shank in said chamber, substantially as shown and described.

2. In combination with a shaft having a chamber in one end, a split socket 12 provided with a shank and having slots in its sides, a second shaft having a ball separated therefrom by a neck $11^b$, said ball being adapted to fit said socket, external pins on the ball to register with said slots, and means to secure said shank in said chamber, substantially as shown and described.

3. In combination, in a universal joint, a shaft chambered at one end, a second shaft having a pin-provided ball $11^a$ at one end, and a slotted socket 12 comprising two halves provided with shank-sections adapted to enter the recess in the first shaft, and means to secure said shank-sections in said recess, said socket arranged to receive said ball with its pins in the shank-slots, before being attached to said first shaft, substantially as shown and described.

In testimony whereof I have signed this specification in the presence of two subscribing witnesses.

ALBERT A. PIXLEY.

Witnesses:
F. A. CUTTER,
S. S. TAFT.